United States Patent
Lee et al.

(10) Patent No.: US 10,756,664 B2
(45) Date of Patent: Aug. 25, 2020

(54) SYSTEM FOR APPLYING MAXIMUM DRIVING EFFICIENCY POINT OF LOAD

(71) Applicant: KOREA DIGITAL CONTROL CO., Anyang-si, Gyeonggi-do (KR)

(72) Inventors: Yong Hae Lee, Anyang-si (KR); Jung Hoon Lee, Gunpo-si (KR)

(73) Assignee: KOREA DIGITAL CONTROL CO., Anyang-si, Gyeonggi-Do (KR)

( * ) Notice: Subject to any disclaimer, the term of this patent is extended or adjusted under 35 U.S.C. 154(b) by 35 days.

(21) Appl. No.: 16/314,182

(22) PCT Filed: Jul. 4, 2017

(86) PCT No.: PCT/KR2017/007069
§ 371 (c)(1),
(2) Date: Feb. 26, 2019

(87) PCT Pub. No.: WO2018/008936
PCT Pub. Date: Jan. 11, 2018

(65) Prior Publication Data
US 2019/0207548 A1    Jul. 4, 2019

(30) Foreign Application Priority Data
Jul. 4, 2016 (KR) ......................... 10-2016-0084401

(51) Int. Cl.
*H02P 27/08* (2006.01)
*H02P 21/22* (2016.01)
*H02P 21/00* (2016.01)
*H02P 27/06* (2006.01)

(52) U.S. Cl.
CPC .............. *H02P 27/08* (2013.01); *H02P 21/00* (2013.01); *H02P 21/22* (2016.02); *H02P 27/06* (2013.01)

(58) Field of Classification Search
USPC .......................................................... 318/560
See application file for complete search history.

(56) References Cited

U.S. PATENT DOCUMENTS 4,249,120 A * 2/1981 Earle ...................... H02P 27/08
318/729

FOREIGN PATENT DOCUMENTS

| JP | 2011-036061 A | 2/2011 |
| JP | 2016-100961 A | 5/2016 |
| KR | 10-2013-0037054 A | 4/2013 |
| KR | 10-1335414 B1 | 12/2013 |
| KR | 10-2014-0133782 A | 11/2014 |

* cited by examiner

*Primary Examiner* — Bentsu Ro
(74) *Attorney, Agent, or Firm* — Novick, Kim & Lee, PLLC; Jae Youn Kim (57) ABSTRACT

A system for applying maximum driving efficiency point of load includes: a motor for driving a load; an inverter for controlling the speed and the voltage of the motor; a sensor unit for measuring the magnetic flux maintaining current and the torque current of the motor; and a control unit determining the speed of the inverter and using the proportional value of the magnetic flux maintaining current and the torque current measured within a range in which the total current does not increase when the motor is driven at the determined speed. The motor inverter control system can control both motor speed and voltage to select the lowest frequency within the permissible range and at the same time control the voltage at the water head to maximize power, thereby reducing power consumption to a minimum.

14 Claims, 7 Drawing Sheets

| Industry segment | Function | Usage | Specific device name |
|---|---|---|---|
| FAN BLOWER | Air supply Ventilation | Air handling unit in building | Blower, Cooling tower |
| | | Temperature control | Drying furnace, Hot wind route |
| | | Dryer, Temperature, Humidity control | Veneer plywood, Fish drying, Textile processing |
| | | Smoke control, Ventilation equipment | Soldering device, Painting house |
| | | Air handling unit in livestock house | Henhouse, Piggery |
| PUMP | Oil supply | Water and sewage pump | |
| | | Water supply equipment | Tankless pump, Pressurized pump, Waterjet pump |
| | | Cooling water pump | AHU, Refrigeration equipment, Various machines |
| | | Oil supply equipment | |
| | Fluid transfer, Other | Liquefied gas transfer facility | |
| | | Nozzle pressure control | Fiber dyeing, Rice mill |

SYSTEM FOR APPLYING MAXIMUM DRIVING EFFICIENCY POINT OF LOAD

TECHNICAL FIELD

The present invention relates to a system for controlling a motor driving a load such as a fan, pump, blower, etc., and controlling the speed and voltage of the motor at the same time to apply the maximum efficiency point of the load.

BACKGROUND ART

Generally, in order to drive the air-conditioning fan or the pump circulating the water, the torque of the driving motor has to be increased in proportion to the square of the speed. In this way, when the power supply voltage is directly connected to the motor driving the load of the quadratic torque type, energy waste is increased. In other words, if a power frequency of 60 Hz is used as a reference of the rotation speed and an induction motor having 4 poles is taken as an example, the reference speed becomes 1800 rpm, and the speed is operated regardless of the load condition. Therefore, it has been causing unnecessary energy consumption under partial load conditions. This problem can be solved by applying an inverter that controls the speed according to the load.

The load and the energy saving principle are explained more specifically.

Figure 1:
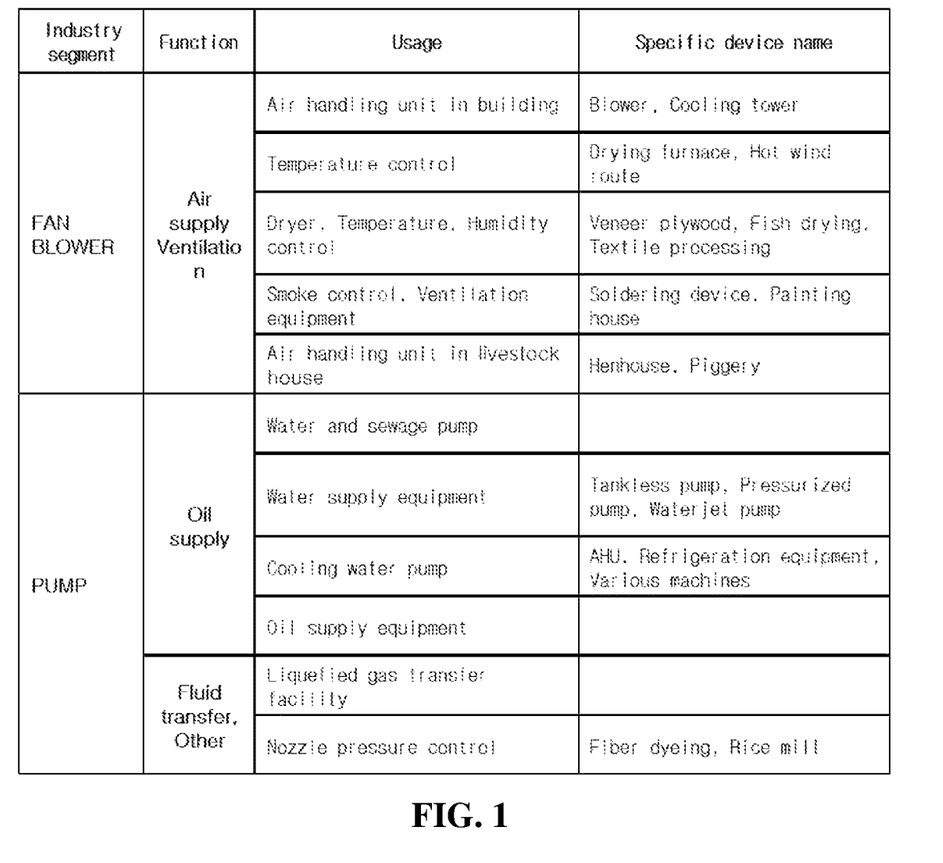
FIG. 1 is an example table for the load of the motor powered machine.

As shown in FIG. 1, a load, for example, quadratic torque load, is a load of a centrifugal pump and a centrifugal fan, and is characterized in that electric power is consumed in proportion to the three squared of speed due to friction and inertia. Therefore, reducing the speed of the motor reduces power consumption further, which can significantly reduce energy.

To explain further, suppose that the pump is operated at a speed of 1800 rpm for one hour. At this time, it is assumed that the consumed power or electric power charge is 100%. Then reduce the pump by 50% at a speed of 900 rpm, and instead increase the operating time by 2 times to 2 hours. Then, the actual amount of flow pumped by the pump is the same, but its power usage or electricity charge is only 14% instead of 100%. In other words, by reducing the speed by 50%, the power consumption can be saved by as much as 86%.

If this pump is 37 kW, if we assume that 37 kW will be operated one hour a day for one year, that electricity fee will be charged around 1195$. However, to operate one hour a day for 4 hours with different speeds, instead of reducing the speed, its power is estimated to be around 19$. Also, if you run the pump slowly in 6 hours, the power is charged by 48$, but you can supply an amount like 1,194$ electricity before. As described above, because the power is consumed in proportion to the three squared power of the speed, the power reduction can be dramatically reduced if the speed is reduced. The power consumption proportional to the three squared power is called affinity law #3.

Therefore, energy can be saved by controlling the motor by using the inverter.

Hereinafter, the control operation according to the load size of the conventional inverter technology will be described in detail.

First, the characteristics of a motor, that is, an induction motor will be described.

The speed N (r/min) of the induction motor is expressed by the following formula.

$$N = \frac{120 \times f}{P}(1-S) \quad \text{[formula 1]}$$

Where N is the speed of the induction motor (or motor), f is the frequency, P is the number of motor poles, and S is the slip.

According to affinity law #1, the flow rate Q is proportional to the change in the number of revolutions (or the speed of the induction motor) (N). Therefore, the faster the speed of the induction motor, the more the flow rate supplied by the motor increases proportionally.

In addition, there is the following relationship for the voltage V of the induction motor, the frequency f and the magnetic flux (torque).

$$\Phi \propto \frac{V}{f} \quad \text{[formula 2]}$$

Where Φ is the magnetic flux, V is the voltage, and f is the frequency.

At this time, the magnetic flux (Φ) or torque (τ) of the induction motor should be controlled by the size of the load, that is, the size (or height) of the head H. That is, It is necessary to control the voltage applied to the motor to the minimum magnitude that the maintaining and torque flux drive the load size.

Since the inverter can arbitrarily control the frequency f and the voltage V, the induction motor can be operated at a variable speed.

As an example of pumping, the flow quantities and heads at the load side correspond to the frequency f and the voltage V at the driver (inverter and induction motor) side, respectively. That is, by the inverter, how fast and how much power will be pumped up. That is, the variable that determines how fast the pump will pumped up is the frequency f, and the water head that determines how high the pump is raised determines the voltage V at the inverter side. Specifically, when pumping up the water, the element of "how much flow, how fast will you pumped up the water", the voltage factor is determined by the location of the reservoir tank, such as 5, 10, or 60 stories high. The control element of the pump is "how fast" and "how high" it is to be raised, the former corresponds to the flow Quantity, and the latter corresponds to the head. The higher the water head, the higher the water pressure, so the bigger the torque is required in the pump to meet the water pressure, so the "head/pressure/torque" has the same meaning.

So, in order to reduce the power to the maximum, the voltage corresponding to the water head must be controlled, and the power can be reduced to the maximum by selecting the lowest frequency. Conversely, reducing power to the maximum level results in the highest efficiency.

However, according to the related technology, when the motor for the load is controlled by the inverter, mainly the speed of the motor is controlled[Patent Literatures 1 and 2].

That is, the inverter of the related technology is used to determine the number of revolutions of how fast the motor is to be rotated, and the inverter determines the number of revolutions of the motor. Then, the motor manufacturer provides the water head and flow rate curve of the corresponding motor. This water head and flow curve, that is, the H-Q curve (water head-flow curve) are made with the curve required for inverter control using affinity's first law and second law, and accordingly H-N curve (water head-flow curve) to control the inverter.

Figure 2:
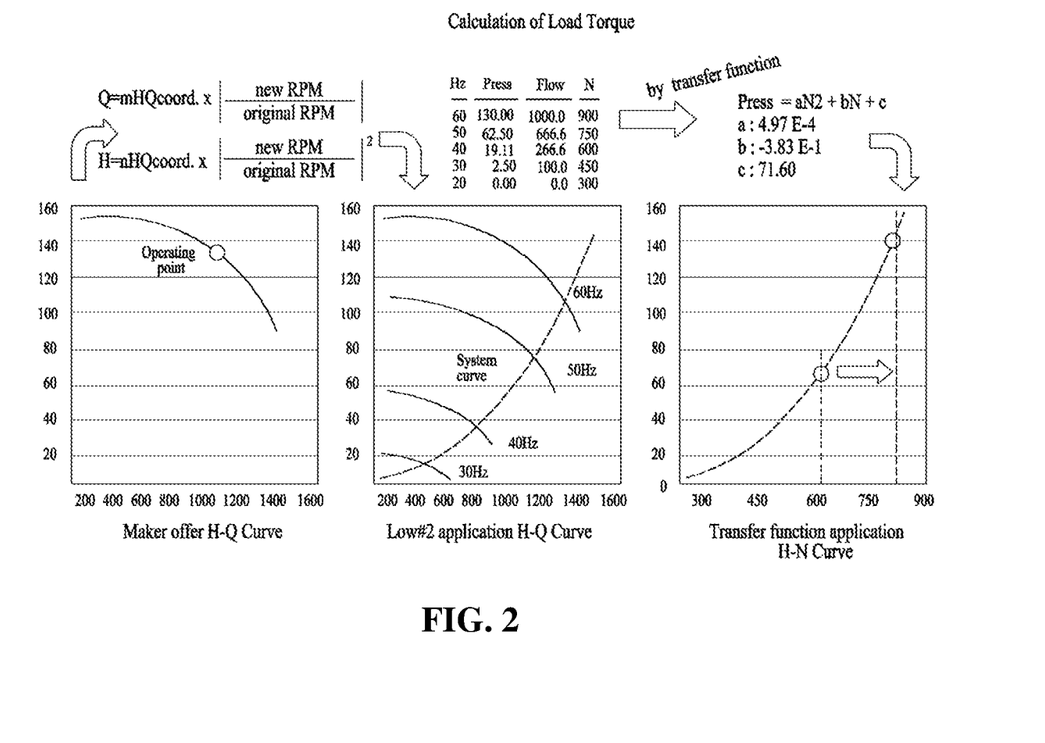
FIG. 2 is a graph showing a process in which a load of a pump is controlled by an inverter.

In other words, as shown in FIG. 2, the flow rate Q can be obtained by applying H-N curve to the motor (or inverter) using the H-N curve after applying the affinity law #1, #2 of the following formulas 3 and 4.

$$Q \propto N \quad \text{[formula 3]}$$

$$H \propto N^2 (T \propto N^2) \quad \text{[formula 4]}$$

Where Q is the flow rate (or air flow rate), N is the velocity, $\tau$ is the torque, and H is the head (or pressure, head, static pressure).

As a result, the current technology controls the inverter to match the H-N curve. Therefore, if the head H is high, the speed N must be controlled to be high. For example, suppose a situation in which an inverter is required to operate at 1800 rpm. At this time, suppose that the necessary head (H) is 120 Pa. It is also assumed that the flow rate required by the current system is 1200 rpm in order to reduce power by the affinity low. That is, the speed of the motor can be reduced from 1800 rpm to 1200 rpm. However, when I tried to rotate the motor speed to 1200 rpm, when I looked at 1200 rpm, the head (H) was only 50 Pa. Therefore, since the required head is 120 Pa, it can not be pumped up when operated at 1200 rpm. However, according to the H-N curve, when the head is 120 Pa, the motor speed must be 1600 rpm.

Therefore, the motor speed can be reduced from 1800 rpm to 1200 rpm for power reduction, but it can be reduced to only 1600 rpm due to the H-N curve limitation. As described above, power consumption is proportional to the three squared of the speed by the affinity low. According to the related technology, power can be saved only by the third power of 200 rpm at 1800 rpm and 1600 rpm. However, since the motor speed can be reduced to 1200 rpm, the power corresponding to the third power of 400 rpm, which is the difference between 1600 and 1200, is wasted.

When the motor is rated at an efficiency in rated operation, the motor becomes saturated by increasing the voltage with respect to the rated frequency in EMF equation $V=4.44 f n \varphi$ (V: voltage, n=number of turns, $\varphi$=magnetic flux). Therefore, the frequency control of inverter controls the ratio of rated voltage/rated frequency constantly.

As mentioned earlier, in order to raise the water, it is necessary to control both the flow rate and the head of water. However, the head of water does not fit properly when the control is performed only by the flow rate. Thus, according to the related technology the two control elements, namely, the flow rate and the head of water, must be satisfied, so that the water is quickly pumped up and the flow rate is greatly increased to match the head of water. As a result, 400 rpm is consumed more and power corresponding to three squares of 400 rpm is wasted. Calculating this, it is estimated that 44% of the power is wasted. Therefore, it can be seen that the conventional inverter is not able to control the voltage, so that the power is wasted at a large amount in the square-root reduction load. Since the conventional inverter can not control the voltage, it is necessary to raise the water at a speed of 1200 rpm. However, the water is pumped at a speed of 1600 rpm, which causes a large amount of power waste due to the affinity law.

Further, techniques using an inverter for controlling the torque have been proposed (Patent Documents 3 and 4), and vector control inverters for torque control have been commercialized. Therefore, it can be applied to the load by using an inverter that controls the torque instead of the voltage. However, in the case of an inverter using a torque, that is, a vector-controlled inverter, the inverter is sold at a price about 2.5 times as high as that of an inverter that controls only a speed. In addition, even a vector-type inverter capable of controlling torque is not designed to achieve maximum efficiency control in a load. Even if it is designed with maximum efficiency control, it is impossible to control at the maximum efficiency practically because all the necessary conditions in the load are not known by the inverter.

In other words, the vector control (Vector control, Field oriented control) method separates and controls the torque component and the flux component, and is widely used for high performance variable speed control with excellent control performance. However, since the number of controllers is large and complex and the amount of information to be detected is large, the manufacturing cost is high and it is disadvantageous in terms of economy.

In summary, in the related technology, when the voltage depending on the flow rate is larger than the required water head, it can not be reduced to the voltage suited to the water head, so that it is impossible to reduce the power consumption, so there is a problem that the maximum efficiency operation can not be performed.

DISCLOSURE

Technical Problem

An object of the present invention is to solve the above-mentioned problems, and it is to provide a system for applying maximum driving efficiency point of load that controls a motor that drives a load such as a fan, a pump, and a blower, and simultaneously controls a speed and a voltage of the motor.

Technical Solution

In order to achieve the above object, the present invention provides a motor control system for controlling a motor system including a motor and an inverter, comprising a control unit which determines the control speed and the control voltage to optimize the power consumption efficiency of the motor and controls the inverter to drive the speed and voltage of the motor according to the determined control speed and control voltage.

Further, the present invention provides the motor control system, wherein the control unit determines the optimum control voltage of the motor to supply the minimum magnetic flux maintenance amount that needs to maintain the magnetic flux holding current of the motor when the motor is driven at the determined control speed.

Further, the present invention provides the motor control system, wherein the system further comprises a sensor unite for measuring the current of the motor, and wherein the control unit determines the control speed, calculates the current index using the measured current value when the motor is driven at the determined control speed, and determines the control voltage according to the calculated current index or the change amount of the current index.

Further, the present invention provides the motor control system, wherein the current index is at least one of a relative magnitude of a current corresponding to a torque of the motor, a magnitude of the holding current of the motor, and a magnitude of the total current of the motor.

Further, the present invention provides the motor control system, wherein the relative magnitude of a current corresponding to a torque of the motor is calculated by the input current of the motor or the magnitude of the torque current of the motor corresponding to the magnetic flux holding current of the motor.

Further, the present invention provides the motor control system, wherein the change amount of the current index is measured and calculated when the motor is driven at the determined control speed and the dropped control voltage while the control voltage is gradually dropped from the preset initial control voltage.

Further, the present invention provides the motor control system, wherein the control unit sets the voltage set as the optimum control voltage when change amount of the current index becomes less than or equal to a preset threshold value.

Further, the present invention provides the motor control system, wherein the control unit decreases the control voltage and calculates the change amount of the total current after the voltage drop, and sets the voltage before the voltage drop as the optimum control voltage even if the relative magnitude variation of the torque current is greater than or equal to a predetermined threshold value when the change amount of the total current is larger than a predetermined minimum change amount.

Further, the present invention provides the motor control system, wherein the initial control voltage is set to a rated specific voltage value corresponding to the determined speed.

Further, the present invention provides the motor control system, wherein the change amount (ROC) of the relative magnitude of the torque current to the magnetic flux holding current is obtained by the following equation 1.

$$ROC = \frac{I_q(t)}{I_d(t)} - \frac{I_q(t-1)}{I_d(t-1)} \quad \text{[equation 1]}$$

Here, $I_d(t)$ and $I_q(t)$ are the magnetic flux holding current and the torque current measured at the time point t (t-th time) respectively.

Further, the present invention provides the motor control system, wherein the change amount ($\Delta pF$) of the relative magnitude of the torque current to the input current is obtained by the following equation 2.

$$\Delta pF = \frac{I_q(t)}{I(t)} - \frac{I_q(t-1)}{I(t-1)} \quad \text{[equation 2]}$$

Here, I(t) and $I_q(t)$ are the input current measured at the time point t (t-th time) and the torque current respectively.

Further, the present invention provides the motor control system, wherein the control unit corrects the changing speed of the motor by measuring the speed of the motor when the control voltage is changed.

Further, the present invention provides the motor control system of, wherein the control unit corrects the control speed of the motor by a correction amount ($\Delta f$) using the following equation 3.

Further, the present invention provides an inverter system for controlling a motor, comprising: an inverter for controlling the speed and the voltage of the motor according to a control speed and a control voltage; and the motor control system.

Further, the present invention provides a system for applying maximum driving efficiency point of load, comprising: a motor for driving a load; an inverter that controls the speed and the voltage of the motor according to a control speed and a control voltage; and the motor control system.

Advantageous Effects

As described above, according to the load maximum efficiency point applying system of the present invention, by controlling both the speed and the voltage of the motor, it is possible to select the lowest frequency within the allowable range, and at the same time, by controlling the voltage to the maximum, the power can be reduced to the maximum, thereby making it possible to minimize the amount of electric power used and to reduce the energy to the maximum. That is, in the present invention, the maximum operating efficiency point of the load of the motor powered machine can be applied.

MODES OF THE INVENTION

Hereinafter, specific contents for carrying out the present invention will be described with reference to the drawings.

Further, in the description of the present invention, the same parts are denoted by the same reference numerals, and the repetitive description thereof will be omitted.

First, the configuration of the load maximum operating efficiency point application system for a load according to the first embodiment of the present invention will be described with reference to FIG. 3.

Figure 3:
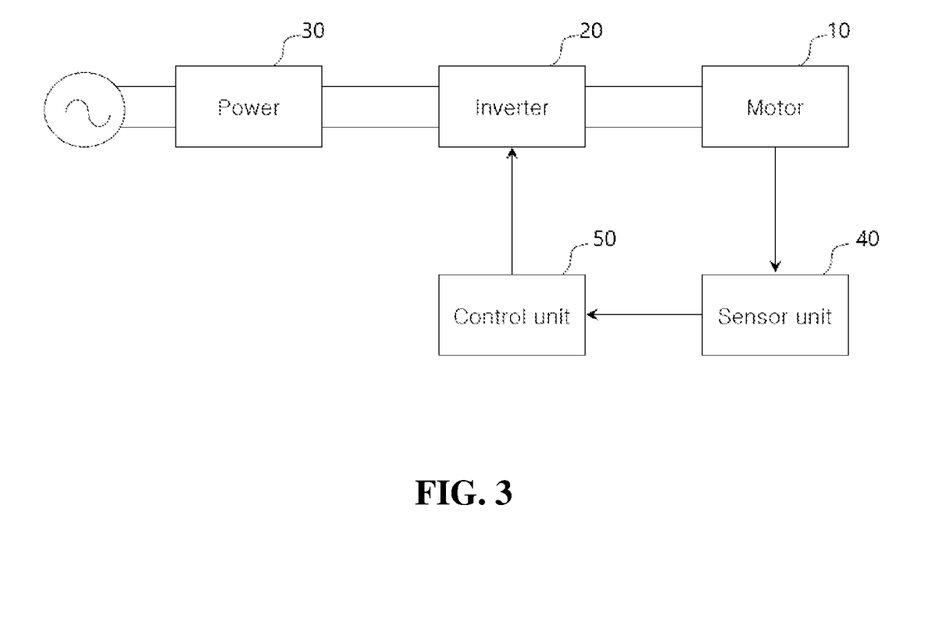
FIG. 3 is a block diagram of a configuration of a maximum operating efficiency point application system of a load according to a first embodiment of the present invention.

As shown in FIG. 3, a system for applying maximum driving efficiency point of load according to the present invention, comprising, the motor 10 for driving the load, an inverter 20 for controlling the speed and the voltage of the motor 10, an a power supply unit 30 for receiving an AC commercial power supply and supplying power to the inverter 20, a sensor unit 40 for measuring the maintaining current and the maintaining current of the motor 10, and a control unit 50 for controlling the voltage and frequency (or speed) of the inverter 20 so as to have the maximum efficiency in consideration of the flow rate to be supplied and the maximum supply time.

The motor 10 is an induction motor that drives a load. For example, the load refers to a load such as an air conditioning fan or a pump that circulates water. As explained in the background technology above, the load has characteristics that power is consumed in proportion to the third power of speed by friction or inertia. An example of a load and a motor for driving the load are as shown in FIG. 1. That is, although the motor to which the present invention is applied is the example of FIG. 1, all the motors that drive all loads are included.

Especially, the optimum operation (minimum iron loss and copper loss and maximum operating efficiency for 365 days of operation) is required for the efficiency decrease due to surplus horsepower by the motor selection (IEC60034-1) above the operating margin in system design. This provides conditions that allow continuous operation for 365 days with driving to minimize core loss and copper loss.

Next, the inverter 20 is an inverter that can control both the speed (or frequency) and the voltage of the motor or the induction motor. For example, the inverter 20 can control both the frequency and the voltage of the motor by a PAM (Pulse Amplitude Modulation) method and a PWM (Pulse Wide Modulation) method.

According to the PAM control method, the inverter 20 is composed of a converter circuit that converts alternating current of the input power source to direct current and an inverter circuit that converts the converted direct current into alternating current by the switching circuit. At this time, in the converter circuit, the magnitude of the voltage is controlled by using the SCR or GTO element instead of the diode when converting the alternating current to the direct current. Then, the speed of the motor is controlled by changing the frequency when alternating current is generated in the inverter circuit.

According to the PWM control method, the inverter 20 controls the voltage by changing the width of the pulse of the AC voltage generated by the inverter circuit. That is, in the converter circuit, the voltage is controlled by adjusting the pulse width of the AC voltage when outputting a constant voltage and converting the DC power received from the converter circuit by the inverter circuit into the AC power supply.

Next, the power supply unit 30 receives an AC commercial power supply and supplies power to the inverter 20. The power supply unit 30 includes a circuit for stability and the like.

Next, the sensor unit 40 consists of sensors that measure the current inside the motor 10. Preferably, the sensor unit 40 is composed of current sensors for measuring the maintaining current ($I_d$) and the torque current ($I_q$) of the magnetic flux in the motor 10. Or the total current in the motor 10 can also be measured.

The current consumed by the motor 10 driving a load such as a pump is classified into a component that maintains the magnetic flux in the motor and a rotational torque component. The former is referred to as the sustaining current or the maintaining current ($I_d$), and the latter is referred to as the torque current ($I_q$). The vector sum of the maintaining current ($I_d$) and the torque current ($I_q$) is the current actually consumed by the motor.

Due to the characteristics of the induction motor, the supplied electric power (electric energy) of the motor 10 flows to a necessary place. That is, when there is no load or low load on the motor 10, the supplied power stays largely as a sustaining component, so that the maintaining current ($I_d$) becomes high. When the load on the motor 10 increases, the power of the sustaining component flows to the torque component. Therefore, as the load on the motor 10 increases, the magnitude of the torque current ($I_q$) increases. When the load becomes larger, that is, when the water head or the pressure becomes larger to increase the torque on the load side, the maintaining current ($I_d$) of the magnetic flux sustaining component flows to the torque component ($I_q$).

In addition, the sensor unit 40 includes a sensor that measures the current speed of the motor 10. When the voltage of the motor 10 is dropped, the speed of the motor 10 may decrease. In order to correct this, it is possible to measure the revolution speed of the motor, correct it with the target motor speed, and control with high accuracy.

Next, the control unit 50 controls the frequency (or speed) and the voltage of the inverter 20. That is, when the control unit 50 determines the control speed and the control voltage, the inverter 20 controls the speed and the voltage of the motor 10 according to the determined control speed and control voltage. Since the inverter 20 controls the speed and the voltage of the motor 10 according to the control speed and the control voltage, in the following description, the control speed and the speed, the control voltage and the speed are mixed. In particular, the control unit 50 sets the speed N (or the control speed) in advance, uses the maintaining current ($I_d$) and the torque current ($I_q$) measured by the sensor unit 40, and set the Voltage (or control voltage).

In other words, the control unit 50 determines the control speed and the control voltage for optimizing the power consumption efficiency of the motor, and the inverter controls the speed and the voltage of the motor in accordance with the determined control speed and control voltage. That is, when the motor is driven at the determined control speed, the control unit sets the optimum control voltage of the motor so as to supply the minimum magnetic flux maintaining portion that needs to maintain the sustain current of the magnetic flux of the motor.

At this time, the control unit 50 determines the control speed, calculates the current indicator using the measured value of the current measured when the motor is driven at the determined control speed, and determines the control voltage based on the calculated current indicator or the change amount of the current indicator. The current indicator can be set to be equal to or larger than the relative magnitude of the current corresponding to the torque of the motor, the magnitude of the maintaining current of the motor, and the magnitude of the total current of the motor. In particular, the amount of change in the current indicator is a value that is measured when the motor is driven at the determined control speed and the control voltage lowered gradually from the preset initial control voltage, and is a changed value of the calculated current indicator. For example, when the change amount of the current becomes equal to or lower than the preset threshold, the set voltage which is lowered is set as the optimum control voltage.

When the determined control speed and the voltage of the control voltage are lowered, the current increases in the course of decreasing due to multiple factors. Utilizing this point, the voltage is lowered until the moment when the current does not increase, and the power consumption efficiency is optimized more.

Specifically, the control unit 50 receives the speed N of the motor by a user or manager, or determines the speed N so as to perform an economical operation based on a flow rate to be supplied and a pumping time. That is, by controlling in this way, the best efficiency point is applied. Also, preferably, when the control voltage is dropped, the speed of the motor may decrease (in the opposite case, the opposite phenomenon occurs), so the control speed of the motor can be corrected in order to match with your favorable motor speed (required motor speed).

Then, the control unit 50 sets the initial voltage Vo corresponding to the speed N. At this time, the initial voltage is preset and stored in advance as a rated specific voltage corresponding to the speed of the motor. The control unit 50 measures the maintaining current ($I_d$), the torque current ($I_1$) and obtains the ratio of $I_d$ and $I_q$ by stepwise. If the change amount (or inclination) (ROC) converges to 0 (zero), the controlled voltage at this time is set to the final voltage (V).

At this time, the copper loss of the motor is maintained and the iron loss is minimized. In particular, it is controlled within a range in which the total current during driving does not increase. That is, the present invention finds a point where the ROC of the proportional value of the torque current is minimized within the range where the total current does not increase while decreasing both the voltage and the speed for the inverter whose voltage alone can not be controlled.

Then, the control unit 50 controls the inverter 20 at the set speed N and the final voltage V.

That is, the control unit 50 firstly sets the speed N at which the energy efficiency can be maximized and searches for the optimum voltage V according to the speed N. The optimum voltage is the voltage magnitude to make all remaining currents equal to the torque current ($I_q$) except for the maintaining current ($I_d$). In addition, since the initial voltage is set to a rated specific voltage value, the maintaining current ($I_d$) is larger than the torque current ($I_q$). That is, the maintaining current ($I_d$) by the rated specific voltage (initial voltage) is always larger than the required portion. Therefore, the voltage is gradually dropped from the initial voltage, and the optimum voltage is found.

In addition, when the control voltage is dropped, the speed of the motor 10 can decrease. In order to correct this, it is possible to measure the current speed of the motor, correct it with the target motor speed, and control with high accuracy.

At this time, the control unit 50 corrects the speed of the motor, obtains the correction amount by [formula 7], and corrects it by the correction amount Δf.

$$\Delta f = \frac{Nsp - N}{120/P} \quad \text{[formula 7]}$$

Where Nsp is the required motor speed, N is the measured current motor speed, and P is the number of poles of the motor.

As the voltage and current decrease, the speed decreases. However, the frequency of the above correction must be increased enough. At this time, the current speed approaches the control speed (requested speed). This process is repeated for feedback. That is, the current speed and the required control speed are compared again to precisely adjust the frequency to the feedback.

Next, a method of controlling the inverter by the control unit 50 according to the first embodiment of the present invention will be described more specifically with reference to FIG. 4. The relative size of the torque current is determined as the ratio of the current vector component after the maintaining current ($i_d$) and the torque current ($i_q$) are transformed from the current, which can be referred to as a current indicator. The minimum current change is set in advance as a current indicator. And a method for determining an optimal control voltage with a variation amount of a relative magnitude of a torque current as a current indicator will be described as an example.

Figure 4:
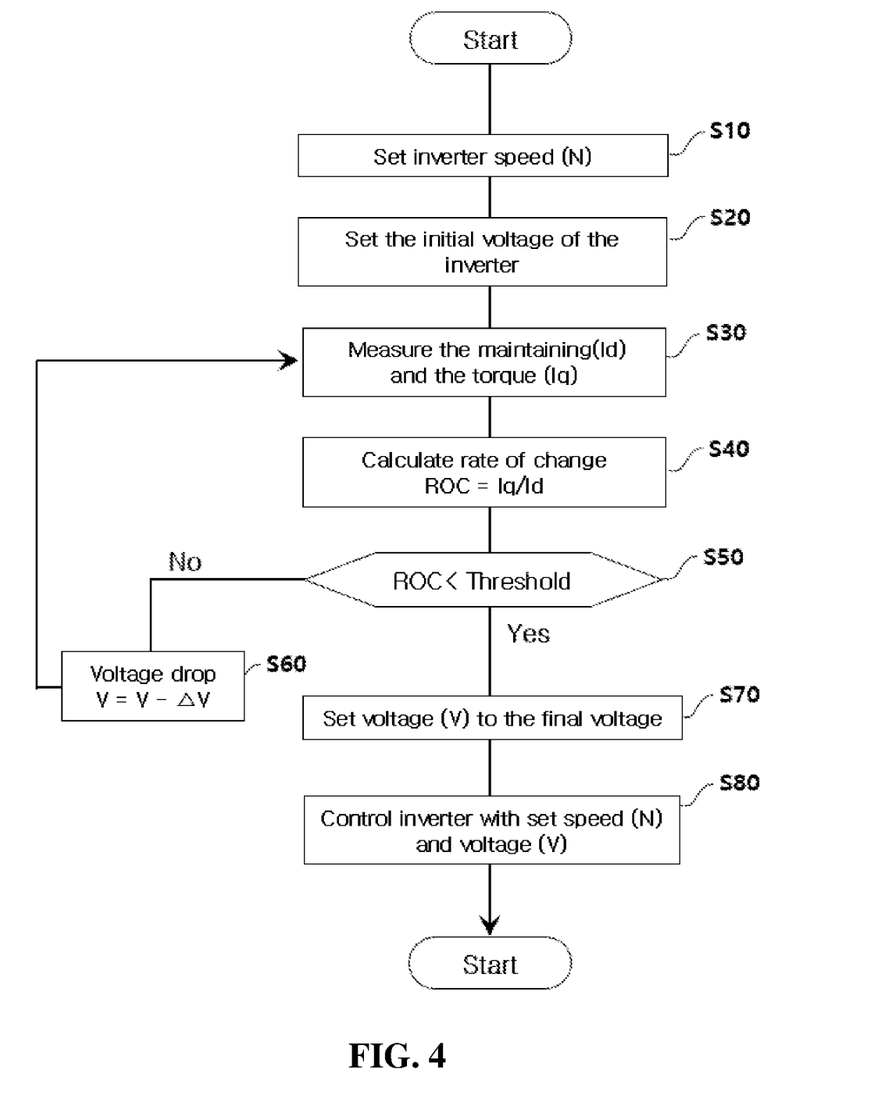
FIG. 4 is a flow chart illustrating an inverter control method according to the first embodiment of the present invention.

As shown in FIG. 4, in the inverter control method according to the present invention, (a) a step for setting inverter speed (S10), (b) a step for setting initial voltage (S20), (c) a step for measuring maintaining current and torque current (S30), (d) a step for calculating the rate of change of the measured current (S40), (e) a step for comparing the calculated change rate with a threshold (S50), (f) a step for reinforcing the voltage and repeating the previous step again if the value is greater than the threshold (S60), (g) a step for setting the voltage as the final voltage if it is within the threshold (S70), and (h) a step for driving the inverter to the set value (S80).

First, the speed N of the inverter 20 is determined (S10).

The control unit 50 determines the speed N so as to have the maximum efficiency in consideration of the supply flow rate and the maximum supply time. That is, suppose that you want to supply the integrated flow $Q_T$ during the limited time T. In this case, the integrated flow rate $Q_T$ is divided by the limited time T and then the flow rate per hour is calculated. Then, the obtained motor speed is set to the speed of the inverter if the speed N of the motor that can supply the calculated flow rate per hour is obtained.

Alternatively, the speed N of the inverter 20 can be entered by a user or a manager or set in advance.

Next, an initial voltage corresponding to the set speed is set (S20).

The control unit 50 stores in advance the value of the rated voltage V corresponding to the speed N of the motor. The data in which these values are set will be referred to as speed-voltage initial data or table.

When the speed N of the motor is determined, the rated voltage V corresponding to the speed N is referred to the speed-voltage initial data or table and the corresponding voltage is set as the initial voltage Vo.

As described above, since the initial voltage is set to the rated voltage as a reference voltage, the initial magnetic flux maintaining current becomes larger than the torque current. That is, the electric power supplied to the motor by the initial voltage is used to maintain the magnetic flux, and it is used with less torque. Hereinafter, the process of determining whether the voltage is optimally controlled is performed by measuring the flux-maintaining current and the torque current.

Next, the magnetic flux maintaining current ($I_d$) and the torque current ($I_q$) of the motor 10 are measured (S30).

The inverter 20 controls the motor 10 separately from the speed N and the voltage V when the inverter 20 is controlled according to the speed N and the voltage V set in advance. Then, the current component in the motor 10 to be driven is measured.

That is, the magnetic flux maintaining current and the torque current of the motor 10 are derived through the current obtained from the current sensors. The control unit 50 receives the current value measured by the sensor unit 40.

Next, the rate of change (ROC) of the proportional amount of the torque current ($I_q$) to the measured magnetic flux maintaining current ($I_d$) is obtained (S40).

The optimum voltage can be obtained by the amount of change in the relative magnitude of the torque current. The relative magnitude of the torque current is relative to the magnetic flux maintaining current or input current. In this case, the relative magnitude of the magnetic flux maintaining current (or the amount of change of the relative magnitude) will be described.

The rate of change (ROC) is the slope of the proportional amount, and preferably obtained from the difference between the proportional value ($I_q/I_d$) measured in the current cycle and the proportional value ($I_q/I_d$) measured in the previous cycle.

That is, the rate of change (ROC) of the torque current relative to the maintaining current is obtained by the following formula 5.

$$ROC = \Delta\left(\frac{I_q}{I_d}\right) = \frac{I_q(t)}{I_d(t)} - \frac{I_q(t-1)}{I_d(t-1)} \quad \text{[formula 5]}$$

Here, $I_d(t)$ and $I_q(t)$ is the magnetic flux maintaining current and the torque current respectively, measured at the time point t (t-th time).

Next, the rate of change (ROC) is compared with the predetermined threshold (S50). The threshold is a preset value, which is close to zero. That is, it is a value for verifying whether the rate of change converges to zero.

Next, the voltage is lowered and the steps (S30 to S50) are repeated and executed if it is not less than the threshold (S60).

Preferably, the voltage decreases at the constant rate from the current voltage and then the voltage to be used next is calculated. Then, the inverter 20 is re-controlled with the newly calculated voltage. The motor is driven by the newly reduced voltage and the magnetic flux maintaining current and the torque current are measured in the driven motor 10. Then, the above steps are repeated while comparing with the threshold.

That is, the control unit 50 sequentially decreases the initial voltage and repeats this procedure until the ratio of the magnetic flux maintaining current ($I_d$) and the torque current ($I_q$) converges to zero or the threshold.

Next, the current voltage is set to the final voltage if it is less than the threshold (S70).

That is, when the slope (or rate of change) of the proportional value of the torque current to the maintaining current converges to 0 (zero), the voltage at that time is set as the final voltage.

Since the optimum speed and voltage of the inverter are set, the inverter is controlled to the optimum speed and voltage, and the motor 10 is driven.

Figure 5:
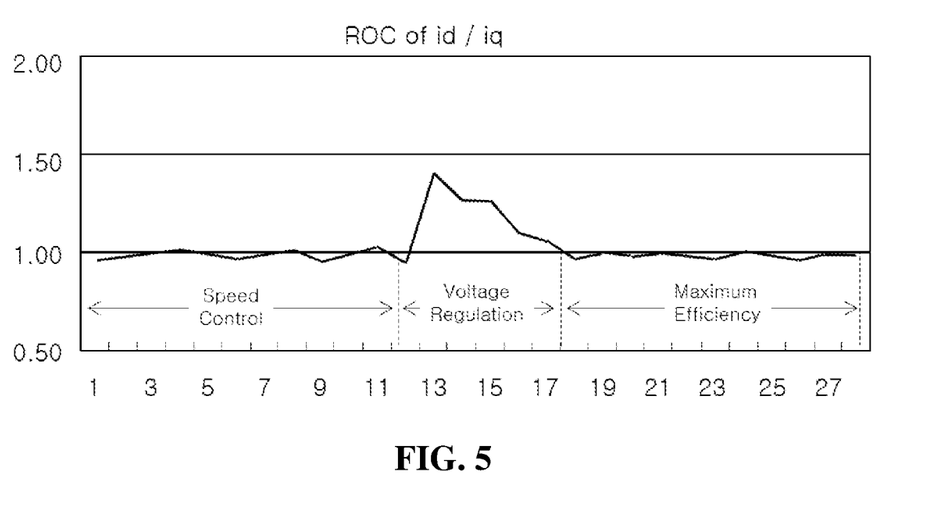
FIG. 5 is a graph showing ROC(Rate of Change) according to the first embodiment of the present invention.

Next, the principle of the inverter control method of the present invention will be described in more detail with reference to FIG. 5.

As in the previous process, the inverter control method of the present invention control the speed in the first step and control the voltage separately in the second step. At this time, the voltage is adjusted and optimal control is achieved when the slope of the value of the magnetic flux maintaining current ($I_d$) divided by the torque current ($I_q$) converges to 0 (zero), while the voltage is gradually decreased, The convergence of the proportional value of the magnetic flux maintaining current and the torque current to 0 is shown in FIG. 5.

At this time, the frequency and current are fixed, and the motor torque is synchronized with the torque demanded by the load.

Figure 6:
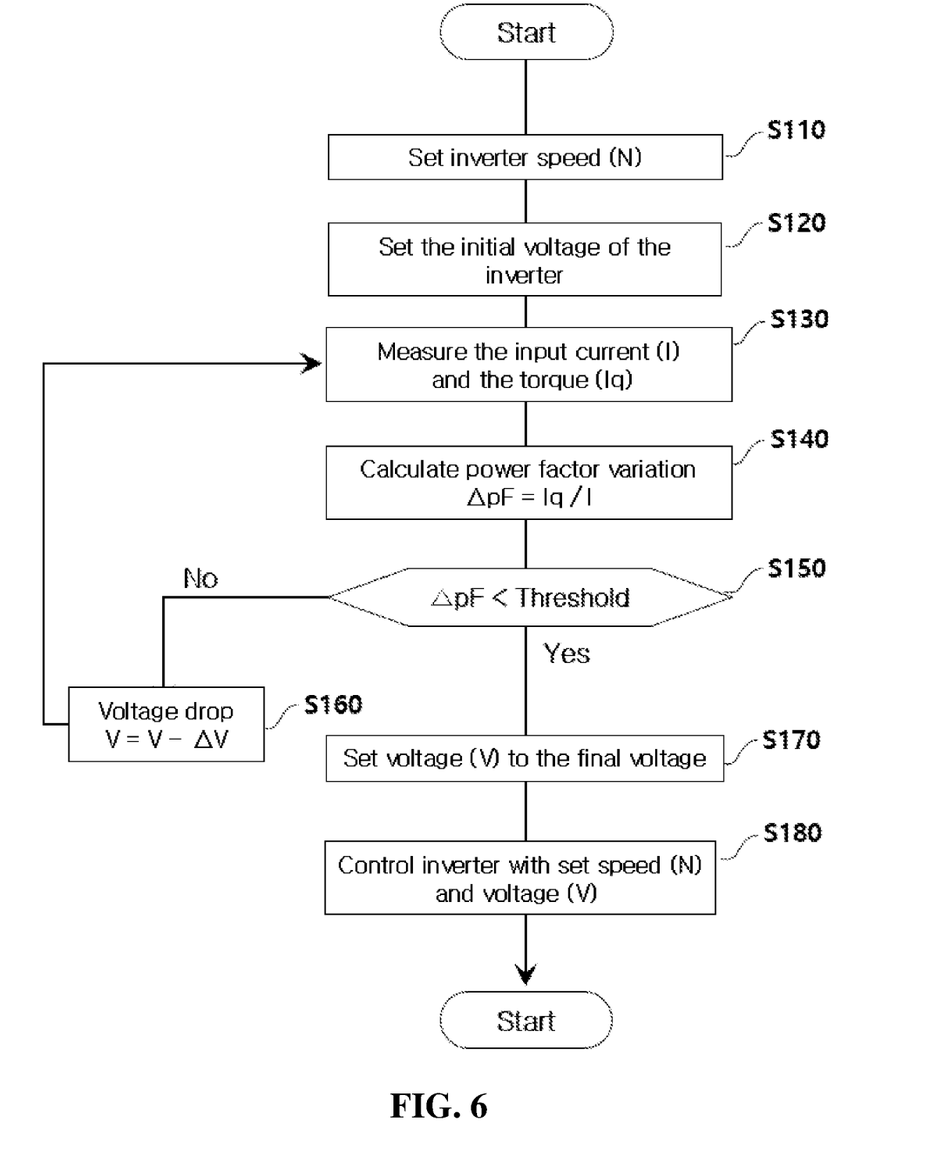
FIG. 6 is a flow chart for explaining the inverter control method according to the second embodiment of the present invention.

Next, a configuration and a control method of a maximum operating efficiency point application system for a load according to a second embodiment of the present invention will be described with reference to FIG. 6

The second embodiment of the present invention controls by the proportional power factor of the input current and the torque current in order to control the inverter instead of using the ROC of formula 5. Only the parts different from the first embodiment will be described below. For the unexplained part, the explanation of the first embodiment described above may be referenced.

First, in the second embodiment of the present invention, the sensor unit 40 is composed of current sensors for measuring the input current (I) and the torque current ($I_q$) in the motor 10.

Next, a method of controlling the inverter of the motor according to the second embodiment of the present invention will be described with reference to FIG. 6.

First, the speed N of the inverter 20 is determined (S110), and an initial voltage corresponding to the set speed is set (S120).

Next, the input current (I) and the torque current ($I_q$) of the motor 10 are measured (S130), and the change amount ($\Delta pF$) of the proportional amount of the torque current ($I_q$) to the input current (I) is obtained (S140).

The change amount ($\Delta pF$) is the proportional amount or the slope of the power factor change, and is preferably obtained by a difference between the power factor or the proportional value ($I_q/I$) obtained in the current cycle and the power factor or the proportional value ($I_q/I$) obtained in the previous cycle.

That is, the change amount ($\Delta pF$) of the torque current to the input current is obtained by the following formula 6.

$$\Delta pF = \Delta\left(\frac{I_q}{I}\right) = \frac{I_q(t)}{I(t)} - \frac{I_q(t-1)}{I(t-1)} \quad \text{[formula 6]}$$

Here, $I(t)$ and $I_q(t)$ is the input current and the torque current measured at the t-th cycle, respectively.

Next, the change amount ($\Delta pF$) of the power factor is compared with the predetermined threshold (S150). The threshold is a preset value, which is close to zero. That is, it is a value for verifying whether the amount of change converges to zero. It is possible to set differently from the threshold of the first embodiment.

Next, the voltage is dropped and the steps (S130 to S150) are repeatedly executed if it is not less than the threshold (S160), and the current voltage is set to the final voltage if it is less than the threshold (S170). In other words, when it is less than the threshold, it is the moment when the power factor becomes the maximum. That is, when the power factor is the maximum, the current voltage at that time is set to the final voltage.

Figure 7:
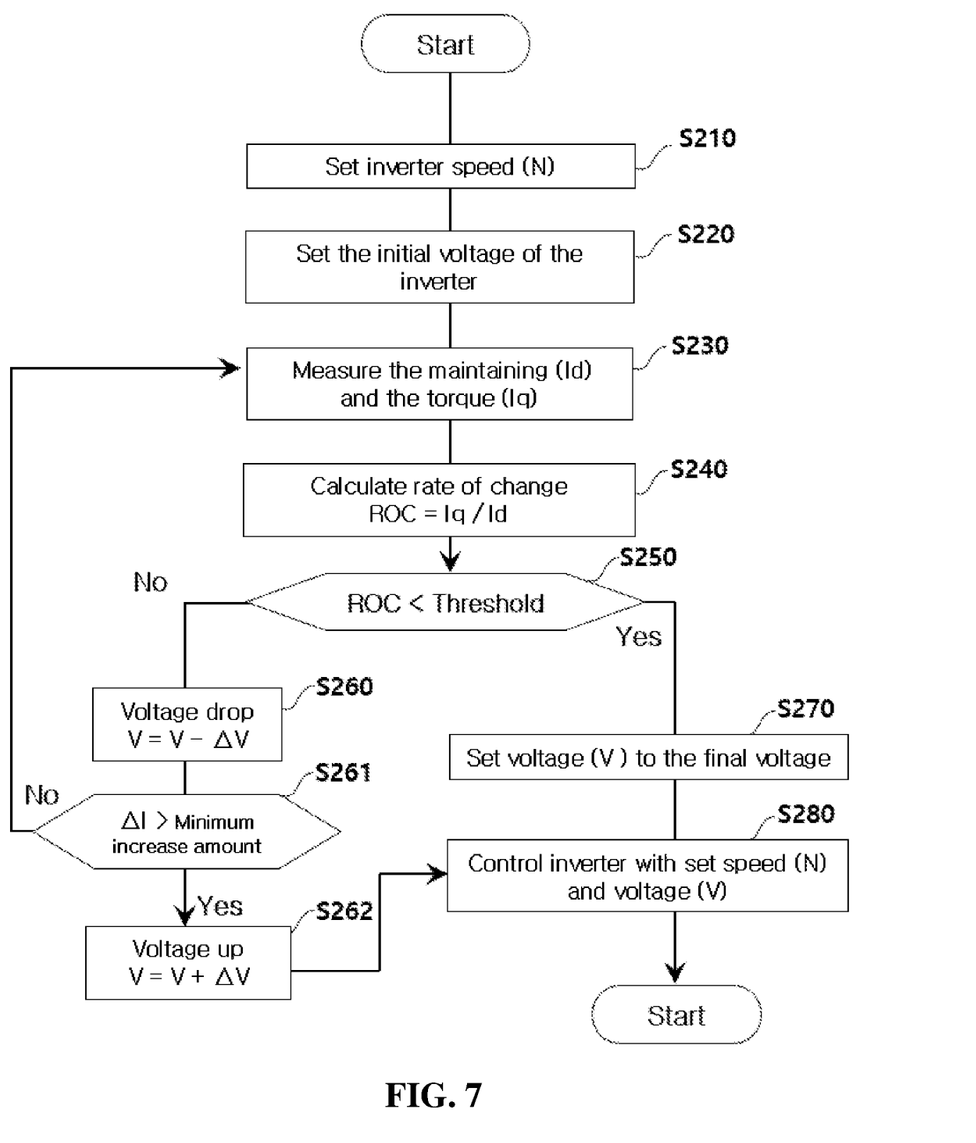
FIG. 7 is a flow chart for explaining the inverter control method according to the third embodiment of the present invention.

Next, a configuration and a control method of a maximum operating efficiency point application system for a load according to a third embodiment of the present invention will be described with reference to FIG. 7.

In a third embodiment of the present invention, the change amount of the total current after the voltage drop is additionally checked in the first embodiment, and the previous voltage is set as the final voltage when the total current increases. Only the parts different from the first embodiment will be described below. For the unexplained part, the explanation of the first embodiment described above may be referenced. As shown in FIG. 7, the speed N of the inverter 20 is first determined (S210), and an initial voltage corresponding to the set speed is set (S220). Next, the magnetic flux maintaining current ($I_d$) and the torque current ($I_q$) of the motor 10 are measured (S230), and the rate of change (ROC) of the proportional amount of the torque current ($I_q$) to the magnetic flux maintaining current ($I_d$) is obtained (S240). The rate of change (ROC) is compared with the predetermined threshold (S250).

Next, the voltage is lowered if it is not less than the threshold (S260). Then, the change amount ($\Delta I$) or the increase amount of the total current is detected, and it is judged whether the increase amount or the change amount of the total current is equal to or more than the predetermined minimum increase amount (S261). At this time, the total current is calculated by measuring the magnetic flux maintaining current ($I_d$) and the torque current ($I_q$) and computing as the vector sum. Or, another current sensor may measure the total current. The increase amount of the total current is calculated as the difference of the total current before the step down and the total current after the step down.

If the increase amount ($\Delta I$) of the total current is less than the minimum increase amount, the previous steps (S230 to S250) are repeatedly executed. Then, if the increase amount ($\Delta I$) of the total current is greater than the minimum increase amount, the voltage is boosted (S262) and the boosted present voltage is set to the final voltage (S270).

Since the optimum speed and voltage of the inverter are set, the inverter is controlled to the optimum speed and voltage to drive the motor 10 (S280).

Next, the effects of the present invention through experiments will be described.

An experiment was conducted to drive a motor 10 such as a pump by an inverter. The speed was controlled by an inverter, and a voltage was measured at a corresponding speed. As a result, the speed of the motor was controlled at 60 Hz, and the voltage was controlled at 380 V from the inverter to the induction motor. At this time, the magnetic flux maintaining current ($I_d$) was 1.63 A and the torque current ($I_q$) was 1.09 A.

Further, the voltage (V) was dropped sequentially while maintaining a state in which the same load could be operated. Finally, the voltage could go down to 190V. At this time, the magnetic flux maintaining current ($I_d$) and the torque current ($I_q$) are inverted. That is, the magnetic flux maintaining current ($I_d$) decreased from 1.63 A to 0.48 A, and the torque current ($I_q$) increased from 1.09 A to 1.54 A. This is the result of experimenting with the same head.

When calculating the power factor, it was 56% before voltage control and it was 93% when voltage control (maximum efficiency control) was performed. That is, the power factor is increased by 40%. Here, since the magnetic flux maintaining current ($I_d$) is decreased and the iron loss is reduced, the current component is reduced by 18%. In other words, it decreased from 1.97 A to 1.6 A as a whole. When the input power was calculated, it was 575 W before the voltage control and 454 W when the voltage control was performed.

Eventually it was reduced by 20%. As a result of this experiment, we will see how much the electric power charge is saved when the motor is driven with the maximum efficiency control of 37 kW for 10 hours in a day.

When operation is performed at 1200 rpm and 338V, the maximum efficiency control will be reduced by 20.3%. So when this 20.3% is reflected in the price again, it will be 2,478$ if you apply 20% from 3,098$. So it can ultimately save 55%.

This means that 55% is not a difference in power rates when operating with a conventional pump or 380V at 60 Hz without an inverter, but 55% less than when using an existing speed controllable inverter. That is, it means that it is further reduced as compared with the energy saving method using the speed control described above in the background technology.

In summary, when the inverter is controlled by speed control only, it can not be controlled at 1200 rpm, so control is performed at 1600 rpm. At that time, the electricity cost is 5,580$. By using an inverter capable of voltage control, however, 338V can be controlled at 1200 rpm, resulting in a power charge of 3.098$. At this point, there is a gain of 44%, where maximum efficiency control can save 20.3% more power, resulting in a total savings of 55%.

Although the present invention has been described in detail with reference to the above embodiments, it is needless to say that the present invention is not limited to the above-described embodiments, and various modifications may be made without departing from the spirit of the present invention.

The invention claimed is:

1. A motor control system for controlling a motor system including a motor and an inverter, the motor control system comprising a control unit which determines a control speed and a control voltage to optimize a power consumption efficiency of the motor and controls the inverter to drive the speed and voltage of the motor according to the determined control speed and control voltage, wherein the system further comprises a sensor for measuring a current of the motor, and wherein the control unit determines the control speed, calculates a current index using the measured current when the motor is driven at the determined control speed, and determines the control voltage according to the calculated current index or a change amount of the current index.

2. The motor control system of claim 1, wherein the control unit determines an optimum control voltage of the motor to supply a minimum magnetic flux maintenance amount that needs to maintain a magnetic flux maintaining current of the motor when the motor is driven at the determined control speed.

3. The motor control system of claim 1, wherein the current index is at least one of a relative magnitude of a current corresponding to a torque of the motor, a magnitude of a maintaining current of the motor, and a magnitude of a total current of the motor.

4. The motor control system of claim 3, wherein the relative magnitude of the current corresponding to the torque of the motor is calculated by an input current of the motor or the magnitude of the torque current of the motor corresponding to a magnetic flux maintaining current of the motor.

5. The motor control system of claim 4, wherein a rate of change (ROC) of the relative magnitude of the torque current to the magnetic flux maintaining current is obtained by the following equation 1:

$$ROC = \frac{I_q(t)}{I_d(t)} - \frac{I_q(t-1)}{I_d(t-1)} \qquad \text{[equation 1]}$$

wherein, $I_d(t)$ and $I_q(t)$ are the magnetic flux maintaining current and the torque current measured at a time point t (t-th time) respectively.

6. The motor control system of claim 4, wherein a change amount ($\Delta pF$) of the relative magnitude of the torque current to the input current is obtained by the following equation 2:

$$\Delta pF = \frac{I_q(t)}{I(t)} - \frac{I_q(t-1)}{I(t-1)} \qquad \text{[equation 2]}$$

wherein, $I(t)$ and $I_q(t)$ are the input current measured at a time point t (t-th time) and the torque current respectively.

7. The motor control system of claim 1, wherein the change amount of the current index is measured and calculated when the motor is driven at the determined control speed and a dropped control voltage while the control voltage is gradually dropped from a preset initial control voltage.

8. The motor control system of claim 7, wherein the control unit sets the voltage set as an optimum control voltage when the change amount of the current index becomes less than or equal to a preset threshold value.

9. The motor control system of claim 8, wherein the control unit decreases the control voltage and calculates the change amount of the total current after the voltage drop, and sets the voltage before the voltage drop as an optimum control voltage even if a relative magnitude variation of the torque current is greater than or equal to a predetermined threshold value when the change amount of the total current is larger than a predetermined minimum change amount.

10. The motor control system of claim 7, wherein the initial control voltage is set to a rated specific voltage value corresponding to the determined speed.

11. The motor control system of claim 1, wherein the control unit corrects a changing speed of the motor by measuring the speed of the motor when the control voltage is changed.

12. The motor control system of claim 1, wherein the control unit corrects the control speed of the motor by a correction amount (Δf) using the following equation 3:

$$\Delta f = \frac{Nsp - N}{120/P} \qquad \text{[equation 3]}$$

wherein, Nsp is a required motor speed, N is a measured current motor speed, and P is the number of pole.

13. An inverter system for controlling a motor, comprising:
an inverter for controlling a speed and a voltage of the motor according to a control speed and a control voltage; and
the motor control system of claim 1.

14. A system for applying a maximum driving efficiency point of load, comprising:
a motor for driving a load;
an inverter that controls a speed and a voltage of the motor according to a control speed and a control voltage; and
the motor control system of claim 1.

* * * * *